United States Patent [19]

Kuroyanagi et al.

[11] Patent Number: 4,537,171
[45] Date of Patent: Aug. 27, 1985

[54] FUEL INJECTION DEVICE

[75] Inventors: Masatoshi Kuroyanagi, Kariya; Masahiko Suzuki, Aichi, both of Japan

[73] Assignee: Nippondenso Co., Ltd., Kariya, Japan

[21] Appl. No.: 583,265

[22] Filed: Feb. 24, 1984

[30] Foreign Application Priority Data

Feb. 28, 1983 [JP] Japan .................. 58-33186

[51] Int. Cl.³ ............................................ F02M 41/00
[52] U.S. Cl. .................................... 123/449; 123/506
[58] Field of Search ............... 123/449, 446, 459, 506, 123/496; 417/289, 294

[56] References Cited

U.S. PATENT DOCUMENTS

| | | | |
|---|---|---|---|
| 2,937,637 | 5/1960 | Heiser | 123/449 |
| 4,385,614 | 5/1983 | Eheim et al. | 123/506 |
| 4,449,504 | 5/1984 | Furuhashi et al. | 123/449 |
| 4,458,648 | 7/1984 | Braun et al. | 123/449 |

FOREIGN PATENT DOCUMENTS

| | | | |
|---|---|---|---|
| 2903551 | 8/1980 | Fed. Rep. of Germany | 123/449 |
| 56-161173 | 5/1980 | Japan. | |
| 56-161175 | 5/1980 | Japan. | |
| 68556 | 4/1982 | Japan | 123/446 |
| 97025 | 6/1982 | Japan | 123/449 |

Primary Examiner—Magdalen Y. C. Moy
Attorney, Agent, or Firm—Cushman, Darby & Cushman

[57] ABSTRACT

A fuel injection device according to the present invention is provided with a controller for controlling a fuel delivering rate from a fuel pumping chamber of the device. The controller has a piston adapted to engage a pump plunger for pressurizing the fuel in a fluid chamber and movable in the axial direction of the pump plunger. During a pressurizing process, the axial position of the piston is adjusted in accordance with the operating state of an engine, thereby controlling the fuel delivery rate or the fuel injection rate.

10 Claims, 13 Drawing Figures

FUEL INJECTION DEVICE

BACKGROUND OF THE INVENTION

The present invention relates to a fuel injection device for an internal combustion engine and, more particularly, to a fuel injection device wherein a fuel injection characteristic or a fuel injection rate can be controlled in accordance with the operating state of the engine.

In general, the performance of an internal combustion engine greatly depends on the method of fuel injection used in the combustion chamber. In particular, in a direct-injection diesel engine, the rate of fuel injection in the combusion chamber directly influences the combustibility of the fuel, and therefore, greatly influences engine performance.

For example, a diesel engine produces more combustion noise than a gasoline engine during idling. The idling noise of the diesel engine is conventionally reduced by lengthening the period of fuel injection without decreasing the amount of the fuel used. Also, it is more effective to operate an engine at a medium or high speed if the injection rate is not only kept low before fuel is ignited in the combustion chamber but also is suddenly increased upon ignition. In this way, fuel is more efficiently burned in the combustion chamber, and a high output of power is obtained.

As may be apparent from the above description, the fuel injection rate must be controlled in accordance with the given operating state of the engine such that combustion noise is decreased during idling, and that the output power of the engine is increased, when the engine is operating at a medium or high speed.

As a means for controlling the fuel injection rate in accordance with the operating state of the engine, distributor-type fuel injection pumps are known, for example in Japanese Utility Model Disclosure Nos. 161173/81 and 161175/81. These conventional fuel injection pumps are provided with a distributing plunger in which the amount of fuel delivered per stroke travel-unit thereof, i.e., the fuel delivery rate, is variable. The distributing plunger has first and second pressurizing surfaces which are used to deliver fuel. The first pressurizing surface can be used for delivering fuel throughout the whole pressurizing stroke, while the second pressurizing surface can be used to deliver fuel only when the distributing plunger reaches a predetermined point of the pressurizing stroke. According to the prior art, fuel injection pumps with such a distributing plunger, therefore, have a short effective pressurizing stroke when the engine is operating at a low speed such as idling. During idling only the first pressurizing surface of the plunger may be used for the fuel delivery. Thus, when the engine is operating at a low speed, the amount of fuel delivered is small, that is, the fuel injection rate is low. When the engine is operating at medium or high speeds, on the other hand, the effective pressurizing stroke of the distributing plunger is long, and both the first and second pressurizing surfaces of the distributing plunger are used to deliver fuel. As in the initial stage of the effective pressurizing stroke of the distributing plunger, the fuel injection rate is low. When a predetermined point is reached in the final stage of the effective pressurizing stroke, the fuel delivery rate can be increased thus raising the fuel injection rate.

In the aforementioned conventional fuel injection pumps, the output of the engine operating at medium, or high speeds is somewhat improved. However this improvement is not satisfactory for the following reason. Since the amount of fuel needed in the injection rate during medium or high speeds increases, based on the pressurizing stroke of the distributing plunger, the fuel injection rate itself cannot effectively be controlled because of the varying operating state of the engine.

In the prior art fuel injection pumps, moreover, the fuel injection rate during low-speeds is simply lowered, and the fuel injection amount is inevitably reduced which results in knocking of the engine.

SUMMARY OF THE INVENTION

The present invention considers these circumstances, and intends to provide a fuel injection device capable of optimally controlling a fuel injection rate in accordance with the continuously varying operating state of an internal combustion engine.

In order to achieve the above and other objects of the present invention, there is provided a fuel injection device for injecting pressurized fuel into a combustion chamber of an internal combustion engine, which comprises: a pump housing; a pump cylinder portion provided in the pump housing; a pump plunger fitted in the pump cylinder portion in such a manner as to slide in its axial direction, the pump plunger defining a fuel pumping chamber for receiving the fuel in the pump cylinder portion; fuel delivery means for reciprocating the pump plunger in the pump cylinder portion, thereby delivering the fuel in the fuel pumping chamber to the combustion chamber; and a controller for controlling a fuel delivery rate from the fuel pumping chamber to the combustion chamber, (i.e.) the fuel delivery rate indicating the amount of fuel delivered from the fuel pumping chamber per stroke travel-unit of the pump plunger, the controller including a body defining therein a fluid chamber into which a fluid is introduced, the body having therein a controller cylinder portion which is provided coaxially with the pump plunger, piston means having a piston fitted in the controller cylinder portion of the body in a liquid-tight manner so as to be slidable in the axial direction of the pump plunger, one end of the piston extending into the fuel pumping chamber and engaging the distal end of the pump plunger so that the piston is moved together with the pump plunger in the same moving direction thereof when the pump plunger is moved in such a direction as to increase the volume of the fuel pumping chamber, and that the piston receives the pressure of the fuel in the fuel pumping chamber to axially move independently of the pump plunger when the pump plunger is moved in such a direction as to decrease the volume of the fuel pumping chamber, and the other end of the piston extending into the fuel chamber and serving to pressurize the fluid in the fluid chamber, and excape means for letting out a part of the fuel in the fluid chamber in accordance with the operating state of the engine when the fluid in the fluid chamber is pressurized by the piston.

According to the present invention, as described above, the escape means is provided for letting out the fluid in the fluid chamber. Thus, the piston can be moved in such a direction as to increase the volume of the fuel pumping chamber, if letting out a substantial part of the fluid in the fluid chamber is let out when the engine is in the low-speed operation, for example. As a result, the fuel delivery rate from the fuel pumping chamber can be lowered, so that the fuel injection rate can be reduced. At the same time, the combustion noise of the engine can effectively be reduced by extending the injection period in the same manner as in the case of the prior art fuel injection device, thereby preventing the injection amount from being reduced due to the reduction of the injection rate.

When the engine is in the medium- or high-speed operation, the movement of the piston in such a direction as to increase the volume of the fuel pumping chamber, which corresponds to the escape amount of the fuel from the fluid chamber, is limited by reducing the escape amount. In the initial stage of the injection period, therefore, the injection rate is low as in the case of the low-speed operation. In the final stage of the injection period, however, the fuel injection rate can be raised by increasing the fuel delivery rate. Namely, a desired fuel injection rate characteristic can be obtained when the engine is in the medium-or high-speed operation.

Thus, according to the present invention, the desired fuel injection rate characteristic can be obtained for the whole range of the engine speed by continuously varying the amount of fuel allowed to escape from the fluid chamber in accordance with the operation state of the engine.

Other advantages of the present invention will be apparent in the following detailed description of illustrative embodiments thereof which is to be read in connection with the accompanying drawings.

DETAILED DESCRIPTION OF THE PREFERRED EMBODIMENTS

Figure 1:
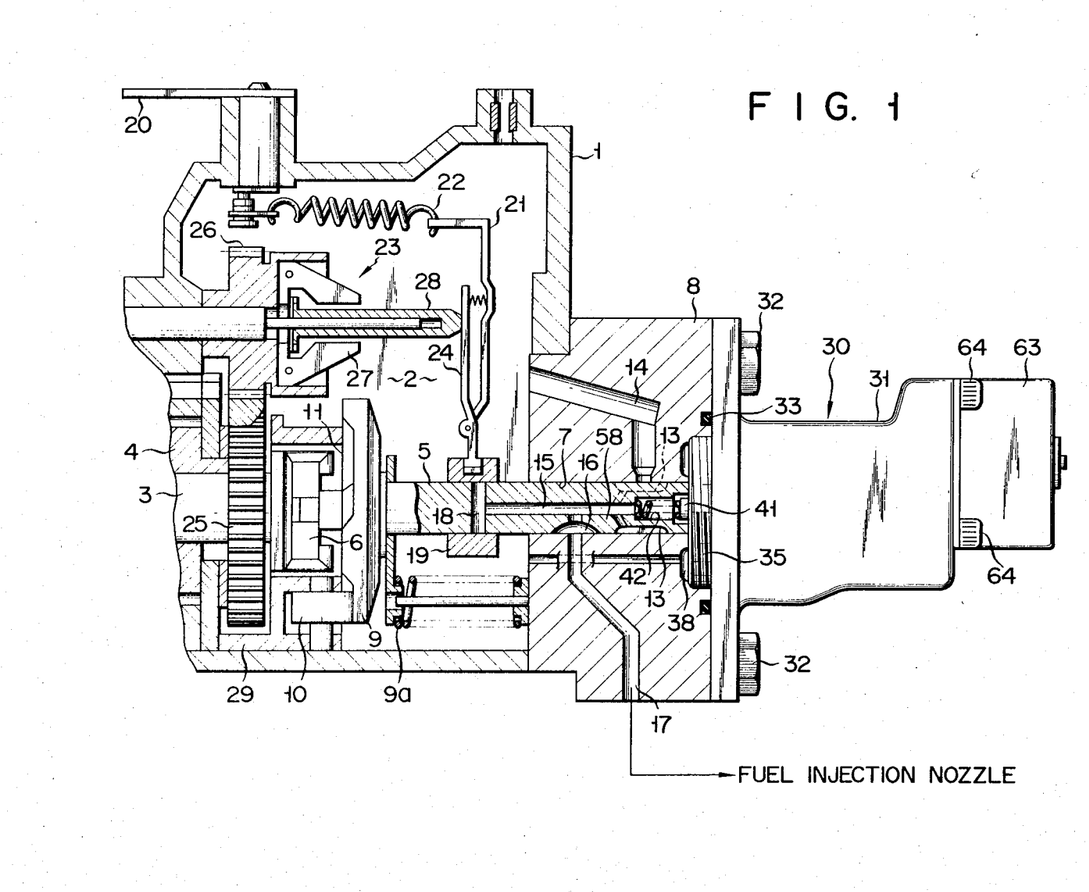
FIG. 1 is a sectional view showing part of a distributor-type fuel injection pump according to a first embodiment of the present invention.

FIGS. 1 to 6 show the first embodiment of the present invention. Referring now to FIG. 1, there is shown a fuel injection device, that is, a distribution-type fuel injection pump.

The fuel injection pump has a pump housing 1 which defines a fuel supply chamber 2 therein. A drive shaft 3 is rotatably supported in the pump housing 1. One end of the drive shaft 3 extends outside the pump housing 1 and is connected to a crank shaft (not shown) of a diesel engine through a power transmission mechanism (not shown). That is, the drive shaft 3 is rotated in synchronism with the diesel engine. A feed pump 4 is connected to a portion of the drive shaft 3. Upon rotation of the drive shaft 3, the feed pump 4 is driven to supply fuel from a fuel tank (not shown) to the fuel supply chamber 2. It should be noted that the pressure inside the fuel supply chamber 2 varies in accordance with the operational speed of the engine. A plunger 5 is coupled to the other end of the drive shaft 3, which extends inside the housing 1, by means of a coupling 6. The coupling 6 connects the drive shaft 3 and the plunger 5 so that the rotation of the drive shaft 3 is synchronized with the plunger 5, and that the plunger 5 is moved axially against the drive shaft 3. The plunger 5 is slidably fitted in a cylinder hole 7 of a distributing head 8. The head 8 is fixed to the outside wall of the housing 1 in a liquid-tight manner.

A face cam 9 is attached to the end portion of the plunger 5 which adjoins the coupling 6.

Cam rollers 10 of a roller holder roll on the cam surface 11 of the face cam 9. When the face cam 9 is rotated upon rotation of the drive shaft 3, the cam surface 11 is put in slidable contact with the cam rollers 10 by the force of a restoring spring 9a, whereby the face cam 9 can reciprocate by moving along the axial direction of the drive shaft 3. In other words, the plunger 5 rotates and reciprocates in the cylinder hole 7 as the drive shaft 3 rotates. The plunger 5 reciprocates in a number that corresponds to the number of cylinders used in an engine during one revolution.

Figure 2:
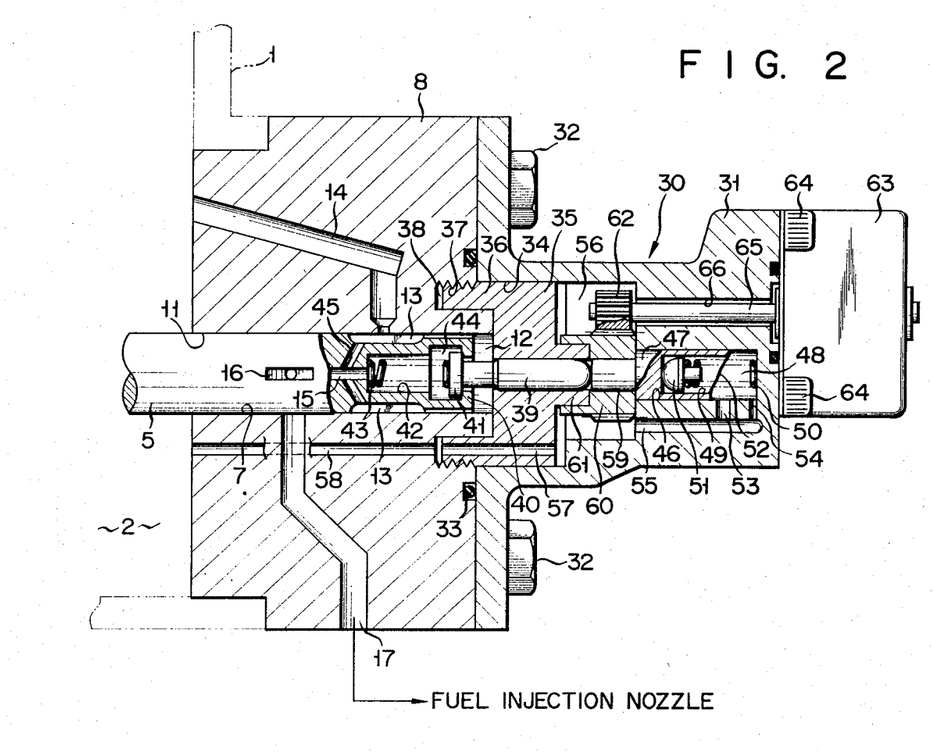
FIG. 2 is an enlarged sectional view showing a controller and a distributing head of the pump shown in FIG. 1.
Figure 3:
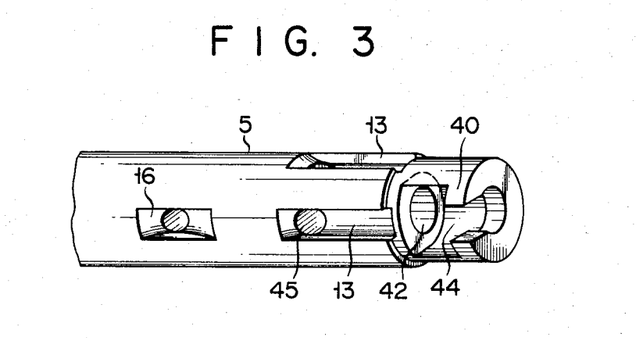
FIG. 3 is a partial perspective view of a plunger of the pump of FIG. 1.

The interior of the cylinder hole 7 is defined as a pumping chamber 12 by the plunger 5. The pumping chamber 12 is shown in FIG. 2.

A pluraliry of suction grooves 13 are formed at equal intervals along the outer surface of the plunger 5. The suction grooves 13 communicate with the pumping chamber 12. The suction grooves 13 can also selectively comunicate with an intake channel 14 formed in the head 8 at a predetermined angle with the plunger 5. The intake channel 14 permanently communicates with the fuel supply chamber 2.

A communicating channel 15 is formed in the plunger 5 which extends along its axis. The communicating channel 15 communicates with the pumping chamber 12. A distributing groove 16 is formed at the central portion of the outer surface of the plunger 5. The distributing groove 16 communicates with the communicating channel 15. The distributing groove 16 can also communicate with one of discharge channels 17 formed in the head 8. The discharge channels 17 are equal to the number of cylinders in the engine. Only one of the discharge channels 17 is illustrated in FIG. 1. Each of the discharge channels 17 is connected to a fuel injection nozzle through a delivery valve. Neither the fuel injection nozzle nor the delivery valve is shown in FIG. 1.

The communicating channel 15 can also communicate with the fuel supply chamber 2 through spill holes 18. The spill holes 18 can be opened and closed by a spill ring 19 which is slidably fitted on the outer surface of the plunger 5.

The spill ring 19 is used to control the opening/closing timing of the spill holes 18. In particular, the spill ring 19 is coupled to an adjusting lever 10 by means of a tension lever 21 and a spring 22. Thus, the spill ring 19 is moved along the axis of the plunger 5 by the agency of the adjusting lever 20, the spring 22, and the tension lever 21.

The tension lever 21 is also coupled to a centrifugal governor 23 by means of a supporting lever 24. The centrifugal governor 23 is rotated by the drive shaft 3 through a gear 25 and a gear portion 26 of the governor 23. When the centrifugal governor 23 is rotated upon rotation of the drive shaft 3, flyweights 27 of the centrifugal governor 23 move a governor sleeve 28 along the axis of the governor 23 in accordance with the engine speed, thereby moving the spill ring 19 along the axis of the plunger 5 through the supporting lever 24.

The basic operation of the aforementioned fuel injection pump will now be described. When the drive shaft 3 is rotated in synchronism with the engine, the plunger 5 reciprocates in the cylinder hole 7 by the agency of the face cam 9 and the cam rollers 10. When the plunger 5 is moved to the left in FIG. 1 so as to increase the volume of the pumping chamber 12, one of the suction grooves 13 communicates with the intake channel 14 upon rotation of the plunger 5. Thus, the fuel is sucked out from the fuel supply chamber 2 and introduced into the pumping chamber 12 through the intake channel 14 and the suction groove 13. This operation constitutes the fuel intake process of the pump. During the intake process. The spill holes 18 are closed by the spill ring 19, and the distributing groove 16 is also held in the closed position. Thereafter, when the plunger 5 is moved to the right to decrease the volume of the pumping chamber 12, the suction groove 13 having so far been in communication with the intake channel 14 ceases to do so as the plunger 5 rotates. In this condition, fuel in the pumping chamber 12 is pressurized by the plunger 5. The fuel pressurizing process of the pump is thus started.

During the pressurizing process, when the fuel in the pumping chamber 12 is pressurized to a predetermined pressure, the distributing groove 16 starts communicating with one discharge channel 17 as the plunger 5 rotated. Thus, the pressurized fuel in the pumping chamber 12 is delivered to the fuel injection nozzle through the communicating channel 15, the distributing groove 16, the discharge channel 17, and the delivery valve. At the end of the fuel pressurizing process, the spill holes 18 are opened by the spill ring 19 so that the pressurized fuel in the pumping chamber 12 spills into the fuel supply chamber 2 through the communicating channel 15 and the spill holes 18. In this condition, the fuel may not be delivered from the discharge channel 17 to the fuel injection nozzle. As a result, in the pressurizing process, the amount of fuel delivered to the fuel injection nozzle is controlled by the timing at which the spill holes 18 are opened.

Meanwhile, the spill ring 19 is moved along the axis of the plunger 5 by the adjusting lever 20 and the centrifugal governor 23 so that the position of the spill ring 19 relative to the spill holes 18 changes in accordacne with the operating conditions of the engine. Namely, the timing at which the spill holes 18 are opened or closed changes in accordance with the engine speed or the degree of depression of an accelerator pedal. As a result, the amount of fuel to be delivered from the pump to the fuel injection nozzle can be controlled in accordance with the operating conditions of the engine.

The above-described operation indicates the fuel delivery process with respect to a single fuel injection nozzle. In practice, however, the fuel delivery process is repeated at a frequency corresponding to the number of cylinders of the engine while the plunger 5 makes one revolution. The proper amount of pressurized fuel is delivered to each of the fuel injection nozzles.

Referring now to FIGS. 1 and 2, a controller 30 for controlling the fuel injection rate will be described. The controller 30 has a body 31 which is fixed to the end face of the head 8 by means of fixing screws 32. Numeral 33 designates an oil seal. A bore 34 is formed in the body 31 on the side of the plunger 5. An internal cylinder 35 is fitted in the bore 34. A rim 36 protrudes from one end side of the cylinder 35. A thread is formed on the outer peripheral surface of the rim 36. The rim 36 of the internal cylinder 35 is screwed in an annular groove 37 with the female screw portion on the end face of the head 8. Namely, the internal cylinder 35 is fixed to the head 8. An annular chamber 38 is defined between the inner end face of the annular groove 37 of the head 8 and the end face of the rim 36 of the internal cylinder 35.

As seen from FIG. 2, the cylinder hole 7 in the head 8 is closed by the internal cylinder 35, so that the pumping chamber 12 is practically defined between the plunger 5 and the end face of the internal cylinder 35.

An intermediate piston 39 is slidably fitted in the internal cylinder 35, extending coaxially with the plunger 5. One end of the intermediate piston 39 extends into the pumping chamber 12 to engage the distal end of the plunger 5. A coupling portion 40 is formed at the distal end of the plunger 5. As seen from FIG. 3, the coupling portion 40 is formed of a partially cut away, hollow cylinder portion. A large-diameter portion 41 is formed at one end of the intermediate piston 39, and is engagedly contained in the coupling portion 40. Here it is to be noted that the large-diameter portion 41 of the intermediate piston 39 can move axially inside the coupling portion 40.

A spring chamber 42 is defined inside the distal end portion of the plunger 5. Housed in the spring chamber 42 is a spring 43 which urges, as required, the intermediate piston 39 to the right of FIG. 2 so that the large-diameter portion 41 of the intermediate portion 39 engages the inner end surface of the coupling portion 40. The spring chamber 42 communicates with the pumping chamber 12 by means of the inside chamber 44 of the coupling portion 40, and also connects with the communicating channel 15. Thus, the spring chamber 42 and the inside chamber 44 of the coupling portion 40 constitute part of the communicating channel 15. As seen from FIG. 2, moreover, the suction grooves 13 communicate with the communicating channel 15 individually by means of communicating holes 45. The communicating holes 45 serve to continually maintain the communication between the communicating channel 15 and the pumping chamber 12 even though the spring chamber 42 is closed by the large-diameter portion 41 of the intermediate piston 39. Thus, the fuel pressure inside the pumping chamber 12 is prevented from being locked.

A cylinder hole 46 is formed inside the body 31, extending coaxially with the intermediate piston 39. A control piston 47 is slidably fitted in the cylinder hole 46 in an liquid-tight manner. Thus, fluid chamber 48 is defined in the cylinder hole 46 between its inner end face and the control piston 47. One end of the control piston 47 extends outside the cylinder hole 46, that is, toward the intermediate piston 39, and a blind hole 49 is formed at the outer end portion of the control piston 47. A return spring 50 is contained in the blind hole 49 and the fluid chamber 48. The return spring 50 urges the control piston 47 to the left of FIG. 2 through the medium of an abutting member 51. Thus, the left-end face of the control piston 47 is always in contact with the right-end face of the intermediate piston 39. Here it is to be noted that the right-end face of the intermediate piston 39 is rounded.

The face of the other end of the control piston 47 which is opposite to the fluid chamber 48 serves as a control surface 52. As seen from FIG. 4, the control surface 52 is in the form of a helical oblique lead as viewed along its axis, so that the control lead 52 may shift its axial position along the circumference when rotated.

A control hole 53 and a throttle hole 54 formed in the body 31 open into the fluid chamber 48. These holes 53 and 54 communicate with a fuel passage 55 formed in the body 31. The fuel passage 55 communicates with a gear chamber 56 which is defined by the internal cylinder 35 in the bore 34. The gear chamber 56 communicates with the fuel supply chamber 2 by means of a fuel passage 57 inside the internal cylinder 35, the annular chamber 38, and a fuel passage 58 formed inside the head 8. Namely, the control hole 53 and the throttle hole 54 communicates with the fuel supply chamber 2 by means of the passages 55, 56, 57, 38 and 58. Accordingly, the fluid chamber 48 is filled with the fuel introduced from the fuel supply chamber 2.

Although the control hole 53 is opened and closed by the control lead 52 of the control piston 47, the throttle hole 54 will never be closed by the control piston 47 irrespective of the axial position of the control piston 47. Namely, the throttle hole 54 continually communicates with the fluid chamber 48.

Figure 4:
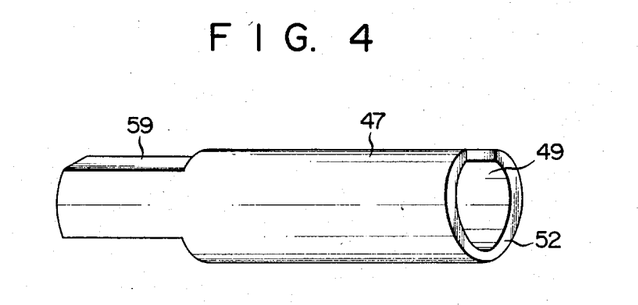
FIG. 4 is a perspective view of a control piston of the controller of FIG. 2.

As shown in FIG. 4, a pair of parallel flattened portions 59 are formed on the outer peripheral surface of the left-end portion of the control piston 47 which projects from the cylinder hole 46. A control gear 60 housed in the gear chamber 56 is mounted on the flattened portions 59 of the control piston 47. Thus, the control piston 47 can slide relative to the control gear 60 in the axial direction, though these two members 47 and 60 are bound to rotate together. In FIG. 2, the left-end of the control gear 60 is rotatably fitted on a cylindrical projection 61 formed on the right-end face of the internal cylinder 35 the cylindrical projection 61 extending coaxially with the control gear 60. Namely, the control gear 60 is supported by the projection 61 of the internal cylinder 35. Accordingly, the control gear 60 transmits only the force of its rotation to the control piston 47, and at this time the weight of the control gear 60 does not act on the control piston 47.

The control gear 60 is in mesh with a gear 62 housed in the gear chamber 56. The gear 62 is rotated by a step motor 63. The step motor 63 is mounted on the body 31 of the controller 30 by means of bolts 64. An output shaft 65 of the step motor 63 extends into the gear chamber 56 through a penetrating hole 66 formed in the body 31. The gear 62 is attached to the end of the output shaft 65.

Instead of using the step motor 63, a DC motor, rotary solenoid or hydraulic actuator may be used as the means for rotating the gear 62.

The operation of the controller 30 will now be described. As mentioned before, when the pump is in the fuel pressurizing process, the plunger 5 pressurizes the fuel in the pumping chamber 12. Therefore, the intermediate piston 39, receiving the pressure of the fuel in the pumping chamber 12 on its left-end face, is moved to the right along with the plunger 5. At the same time, the control piston 47, whose left-end face is always in contact with the right-end face of the intermediate piston 39, is moved to the right against the urging force of the return spring 50. As the control piston 47 moves in this manner, the fuel in the fluid chamber 48 flows to the fuel passage 55 or flows to the side of the fuel supply chamber 2 through the control hole 53. The amount of the fuel released from the fluid chamber 48 corresponds to the displacement of the control piston 47. However, after the control piston 47 is moved to the right to close the control hole 53 by its control lead 52, the fuel from the fluid chamber 48 can go to no other place than to the throttle hole 54. Thus, the control piston 47 hardly moves at all. At the same time, the intermediate piston 39 barely comes to a standstill.

Figure 5:
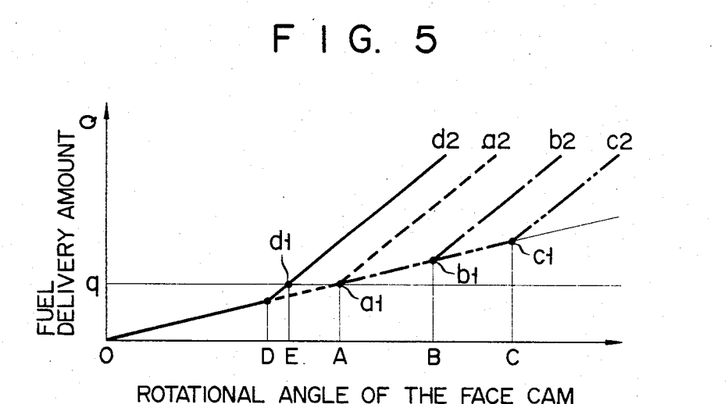
FIG. 5 shows fuel delivery amount characteristic curves of the pump of FIG. 1.

When the intermediate piston 39, along with the plunger 5, is moved to the right, the volume of the pumping chamber 12 is increased by a volume equal to that portion of the intermediate piston 39 which is removed from the pumping chamber 12, so that the effect of the plunger 5 in pressurizing the fuel in the pumping chamber 12 is small. When the intermediate piston 39 is substantially at a standstill, however, the fuel in the pumping chamber 12 is pressurized through the effective pressurizing surface which corresponds to the cross-sectioned area of the plunger 5. It can be said that the fuel pressurizing effect of the plunger 5 is great. After the intermediate piston 39 substantially comes to a standstill, therefore, the area of the effective pressurizing surface increases, as does the fuel delivery rate from the pump to the injection nozzle. In this case, the amount of the fuel delivered from the pump to the injection nozzle is represented by a characteristic curve or line O-al-a2 as in FIG. 5. Symbol A indicates the point of time when the fuel delivery rate increases suddenly. In FIG. 5, the axis of the abscissa represents the rotational angle of the face cam 9, and the axis of the ordinate the amount of fuel delivered from the pumping chamber 12.

When the fuel intake process is started at the end of the fuel delivery process, the pressure of the fuel in the pumping chamber 12 decreases as the plunger 5 moves to the left. As the plunger 5 moves in this manner, moreover, the coupling portion 40 of the plunger 5 moves the intermediate piston 39, along with the plunger 5, to the left pulling the large-diameter portion 41 of the intermediate piston 39. As the intermediate piston 39 is moved to the left, the contract load of the intermediate piston 39 on the control piston 47 is removed, so that the control piston 47 also starts to move to the left, urged by the return spring 50. Immediately after the control piston 47 starts to move to the left, fuel is introduced into the fluid chamber 48 through the throttle hole 54 alone, so that the leftward movement of the control piston 47 is slow. However, when the control piston 47 is moved further to the left to open the control hole 53, fuel is also fed into the fluid chamber 48 through the control hole 53. At this point of time, therefore, the speed of the leftward movement of the control piston 47 is high, so that the control piston 47 moves to the left instantly to abut against the intermediate piston 39. The time interval which elapses from the instant that the control hole 53 is closed by the control surface 52 of the control piston 47 until the fuel pressurizing process is ended is much shorter than the time required for one stroke of the plunger 5. Therefore, the control piston 47 can return to its initial position in good time before the next pressurizing process is started after the preceding pressurizing process is ended.

As may be apparent from the above description of the operation of the control piston 47, the displacement of the control piston 47, that is, the axial distance between the control lead 52 of the control piston 47 and the control hole 53, determines the time when the fuel delivery rate increases suddenly. Since the control lead 52 of the control piston 47 is helical, as described before, the axial distance between the control lead 52 and the control hole 53 can be varied by making the step motor 63 rotate the control piston 47 on its axis through the medium of the gear 62 and the control gear 60.

If the control piston 47 is rotated on its axis to increase the distance between the control lead 52 and the control hole 53, the sudden increase of the fuel delivery rate is delayed from point A to point B, and further from point B to point C, as seen from the fuel delivery amount characteristic curves shown in FIG. 5. In FIG. 5, symbol q indicates the amount of fuel delivered from the pumping chamber 12 that is obtained before the injection pressure of the injection nozzle is reached, that is, before the fuel starts being injected from the injection nozzle. Therefore, the amount of fuel actually injected from the injection nozzle is the remains obtained when the amount of is subtracted. Thus, if the increase in the fuel delivery rate is delayed from point A through point B to point C, the amount of the fuel delivered to the injection nozzle is gradually reduced. If the fuel injection period is fixed, therefore, the injection rate is reduced to cause the decrement of the fuel delivery amount. Meanwhile, the fuel injection rate characteristic can be varied as indicated by curves a3, b3, and c3 in FIG. 6 with a fixed injection amount by adjusting the injection period by means of the adjusting lever 20. The fuel injection rate characteristic curves a3, b3 and c3 of FIG. 6 correspond to the fuel delivery amount characteristic curves a1-a2, a1-b1-b2 and a1-c1-c2 of FIG. 5, respectively. Here it is to be noted that the fuel injection rate characteristic curves of FIG. 6 are given with the condition that the injection period terminates before point C is reached.

Figure 6:
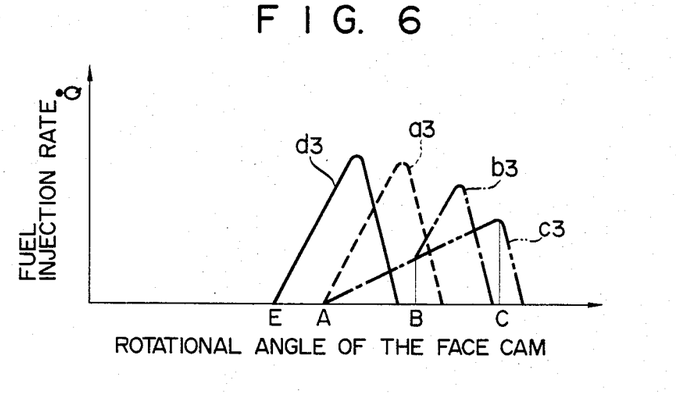
FIG. 6 shows fuel injection rate characteristic curves of the pump of FIG. 1.

If the time for the increase of the fuel delivery rate is advanced from point A to point D, as shown in FIG. 6, the fuel injection timing of the injection nozzle can be advanced from point A to point E. Thus, the fuel injection timing can be advanced in the manner shown in FIG. 6.

More specifically, when the engine is operating at a low speed, such as idling, combustion noise can be reduced by lowering the injection rate in accordance with the fuel injection rate characteristic curve c3 of FIG. 6 and by extending the injection period to prevent a reduction in the injection amount. Especially in compact, direct-injection diesel engine, this implies the possibility of substantially improving combustion efficiency at low speeds.

When the engine is operating at a medium or high speed, combustion efficiency can be improved to increase the engine output by lowering the injection rate at the beginning of the injection period and then by suddenly raising the injection rate at the end of the injection period in accordance with the fuel injection rate characteristic curve b3 of FIG. 6.

Furthermore, when the engine is operating at an extreme high speed, the injection rate can be gradually increased as indicated by the fuel injection rate characteristic curves a3 and d3 in FIG. 6, and the injection timing can be advanced. Thus, when the engine is operating at its peak speed, fuel injection efficiency can be improved.

The above-mentioned fuel injection rate characteristic and injection timing are adjusted by controlling the drive of the step motor 63 in accordance with the operating state of the engine. The injection period is adjusted by means of the adjusting lever 20.

The present invention is not limited to the first embodiment described above. Referring now to FIGS. 7 to 13, second to fourth embodiments of the invention will next be described. In the description to follow, like reference numerals will be used to designate like members with the same functions as those which have been described before in the first embodiment, and therefore, a description of those members is omitted herein.

Figure 7:
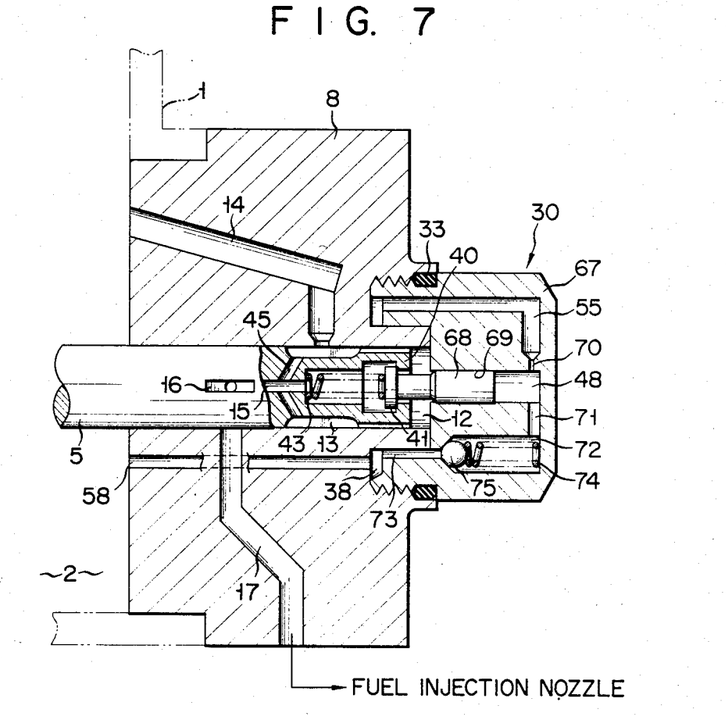
FIG. 7 is a sectional view showing a distributing head and a controller according to a second embodiment of the invention.
Figure 8:
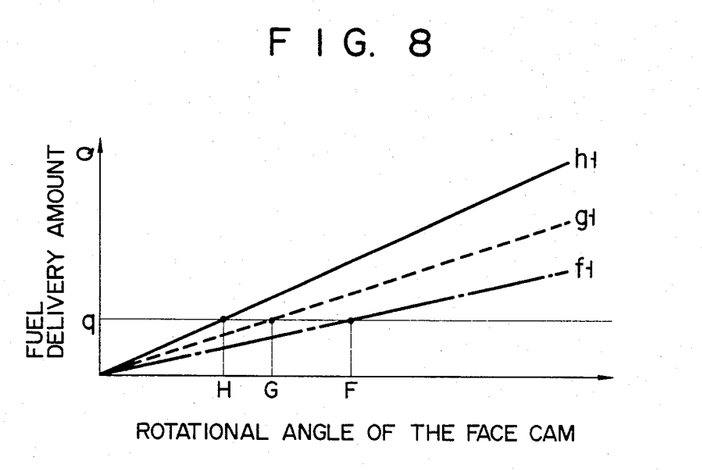
FIG. 8 shows fuel delivery amount characteristic curves obtained with use of the controller of FIG. 7.
Figure 9:
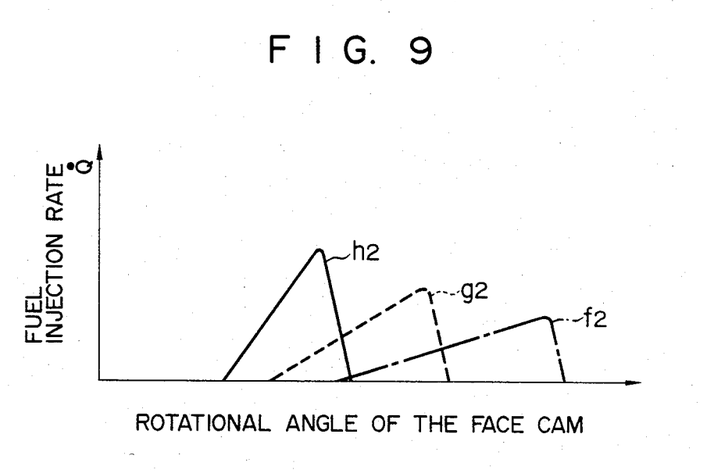
FIG. 9 shows fuel injection rate characteristic curves obtained with use of the controller of FIG. 7.

FIGS. 7 to 9 show the second embodiment of the invention. Referring now to FIG. 7, there is shown a controller 30 which has a body 67 formed by the combination of the body 31 and the internal cylinder 35 of the first embodiment. Like the body 31 of the first embodiment, the body 67 is fixedly screwed in the distributing head 8. In this second embodiment, a piston 68 having the same shape and function as the intermediate piston 39 of the first embodiment is slidably fitted in a liquid-tight manner in a cylinder hole 69 which is formed in the body 67. Thus, the fluid chamber 48 is defined inside the cylinder hole 69 by the piston 68.

A throttle control hole 70 with a diameter wider than that of the throttle hole 54 of the first embodiment and narrower than that of the control hole 53 of the first embodiment opens into the fluid chamber 48. A feed hole 71 also opens into the fluid chamber 48 independent of the throttle control hole 70. The feed hole 71 and the throttle control hole 70 always communicate with the fluid chamber 48 irrespectively of the axial position of the piston 68. The feed hole 71 also opens into a spring chamber 72 which is formed in the body 67. The spring chamber 72 communicates with the fuel passage 58 by means of a fuel passage 73 and the annular chamber 38. A check value 75 urged by a spring 74 is housed in the spring chamber 72. The check valve 75 is adapted to open the fuel passage 73 to lead the fuel from the fuel supply chamber 2 into the fluid chamber 48 when the fuel pressure inside the fluid chamber 48 is lowered below a predetermined level. When the fuel pressure inside the fluid chamber 48 is at or above a predetermined level, on the other hand, the check valve 75 closes the fuel passage 73 to prevent the fuel from flowing backward from the fluid chamber 48 to the fuel supply chamber 2.

The operation of the controller 30 of the second embodiment will now be described. When the engine is operating at a low-speed, the time required for one stroke of the plunger 5 is great, so that the fuel pressure inside the fluid chamber 48 will vary relatively slowly. Therefore, fuel escaping from the fluid chamber 48 to the fuel passage 55 meets with only a small flow resistance in the throttle control hole 70. As a result, fuel in the fluid chamber 48 can flow freely into the fuel passage 55 through the throttle control hole 70, so that the piston 68 can reciprocate axially as if it were integral with the plunger 5. Thus, when the engine is operating at a low speed, the rate of fuel delivered from the pumping chamber 12 is low. In FIG. 8, a curve f1 represents the fuel delivery amount characteristic for the case. The fuel injection rate characteristic obtained is represented by the curve f2 in FIG. 9, which indicates a relatively low injection rate. As in the first embodiment, combustion noise can be reduced by setting the adjusting lever 20 for a long injection period in order to prevent a reduction in the injection amount.

When the engine is operating at a high speed, the time required for one stroke of the plunger 5 is short causing a great variation in the level of fuel pressure inside the fluid chamber 48. Therefore, fuel escaping from the fluid chamber 48 meets with a great flow resistance in the throttle control hole 70. As a result, fuel in the fluid chamber 48 is kept from freely flowing into the fuel passage 59 through the throttle control hole 70, thus keeping the piston 68 substantially at a standstill. When the engine is operating at a high speed, the rate of the fuel delivered from the pumping chamber 12 is high. In FIG. 8, the curve h1 represents the fuel delivery amount characteristic for the case. The fuel injection rate characteristic obtained in this case is represented by a curve h2 in FIG. 9, indicating a relatively high injection rate. As compared with operating the engine at a low speed, the injection timing during high speeds can be advanced from point F to point H.

Furthermore, when the engine is operating at a medium speed, the throttling effect of the throttle control hole 70 is higher than during low speeds, but is lower than during high speeds. In the fuel pressurizing process, therefore, the piston 68 is moved to the right more slowly than the plunger 5, so that the fuel delivery amount characteristic is as represented by curve g1 in FIG. 8. The fuel injection rate characteristic obtained in this case is represented by a curve g2 in FIG. 9. Thus, as seen from FIG. 9, the injection rate and injection timing for medium-speeds are between those used during high and low speeds.

The check valve 75 serves to prevent production of air bubbles in the fluid chamber 48 when the piston 68 moves to the left. The feed hole 71, spring chamber 72, spring 74, check valve 75 and fuel passage 73 may be omitted if fuel pressure inside the fuel supply chamber 2 is so high that the fuel in the fuel supply chamber 2 can be introduced into the fluid chamber 48 through the passages 58, 38 and 55 and through the throttle control hole 70, or that air bubbles produced in the fluid chamber 48 can be extinguished during the intake process to move the plunger 5 to the left, before the start of the subsequent pressurizing process, thereby eliminating the adverse effect of bubbles being produced in the fluid chamber 48.

Figure 10:
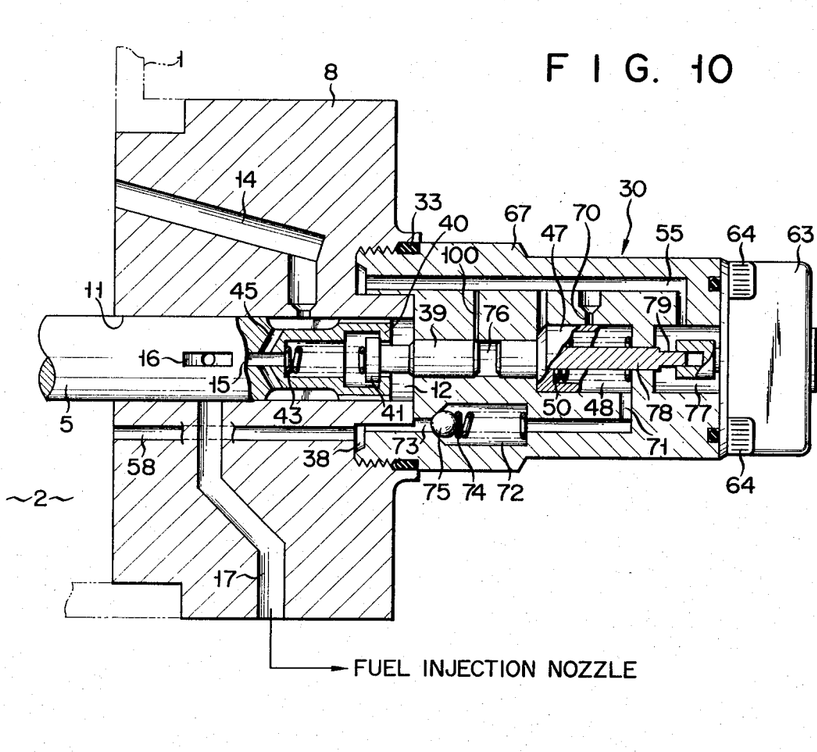
FIG. 10 is a sectional view showing a distributing head and a controller according to a third embodiment of the invention.

Referring now to FIG. 10, there is shown a controller 30 according to the third embodiment of the invention. In the controller 30 of the third embodiment, an fluid coupling chamber 76 is defined between the intermediate piston 39 in the body 67 and the control piston 47. One end portion of the control piston 47 on the side of the fluid chamber 48 is greater than the other end portion of the control piston 47 on the side of the intermediate piston 39. The control piston 47 is provided with a rod 78 which extends from the fluid chamber 48 into a chamber 77. A parallel pair of flattened portions 79 are formed at the right end portion of the rod 78. The output shaft 65 of the step motor 63 is fitted on the flattened portions 79 of the rod 78 to be coupled thereto. Formed in the body 67, moreover, is an adjusting hole 100 which connects the fuel passage 55 and the fluid coupling chamber 76.

The operation of the controller 30 according to the third embodiment will now be described. In the fuel pressurizing process, when the intermediate piston 39 moves to the right to close the adjusting hole 100 as the plunger 5 moves to the right, the fuel in the fuel coupling chamber 76 is sealed. Therefore, even if the intermediate piston 39 is further moved to the right after the fuel in the fluid coupling chamber 76 is sealed, the fuel in the chamber 76 will no longer be allowed to run into the fuel passage 55 through the adjusting hole 100. Accordingly, the moving force of the intermediate piston 39 is transmitted to the control piston 47 by means of the fuel sealed in the fluid coupling chamber 76, so that the control piston 47 starts also to move to the right. As in the case of the first embodiment, the movement of the control piston 47 is stopped when the throttle control hole 70 is closed by the control lead 52 of the control piston 47. Accordingly, the rightward movement of the intermediate piston 39 is also stopped at that time. Namely, the controller 30 according to the third embodiment has basically the same function as the one used in the first embodiment. The adjusting hole 100 is located in the position where it is opened by the intermediate piston 39 during the time interval between the point of time toward the end of the intake process and the start of the pressurizing process. Thus, in the initial stage of the pressurizing process, the fuel pressure inside the fluid coupling chamber 76 is kept substantially constant.

Specific effects of the above-mentioned controller 30 of the third embodiment will now be described. Since the right end face of the control piston 47 facing the fluid chamber 48 has a wider area than that of the left end face thereof facing the fluid coupling chamber 76, the fuel pressure inside the fluid chamber 48 can be made higher than the fuel pressure inside the fluid coupling chamber 76 during the pressurizing process. Therefore, even through the diameter of the throttle control hole 70 is relatively large, it is possible to obtain a good throttling effect on the fuel running out from the fluid chamber 48 into the fuel passage 55. Thus, the throttle control hole 70 can be easily worked, and may be prevented from being clogged with dust or the like mixed in the fuel.

In the pressurizing process, moreover, the intermediate piston 39 presses and moves the control piston 47 through the medium of the fuel sealed up in the fluid coupling chamber 76. Even though the intermediate piston 39 is rotated as the plunger 5 rotates, therefore, the rotating force of the intermediate piston 39 will never be transmitted to the control piston 47 through the fuel in the fluid coupling chamber 76, and the frictional force which should be produced by contact between the intermediate piston 39 and the control piston 47 can be removed.

Figure 11:
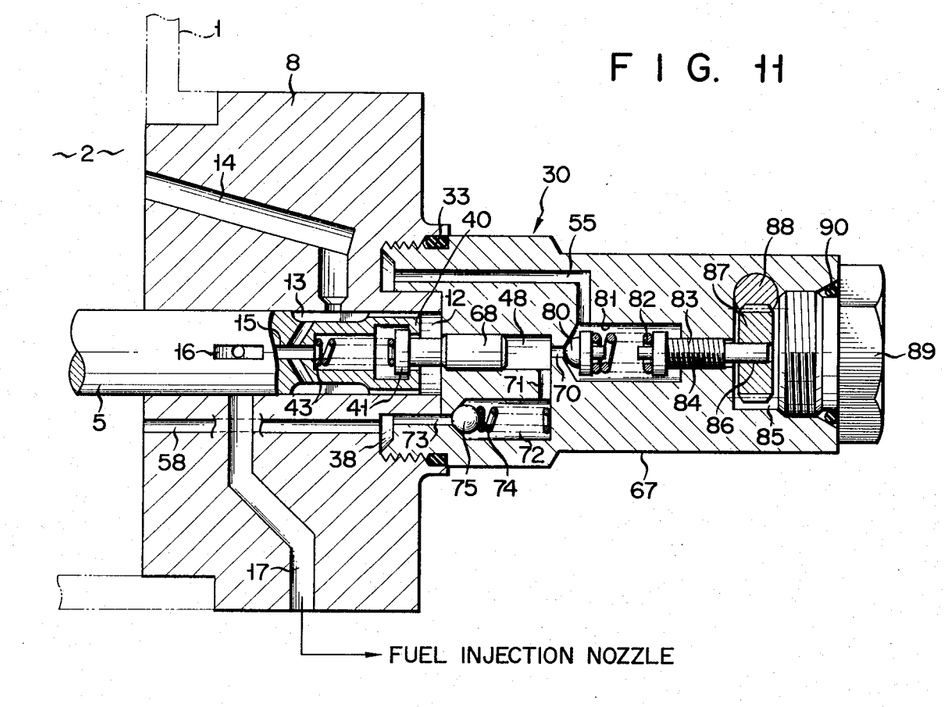
FIG. 11 is a sectional view showing a distributing head and a controller according to a fourth embodiment of the invention.
Figure 12:
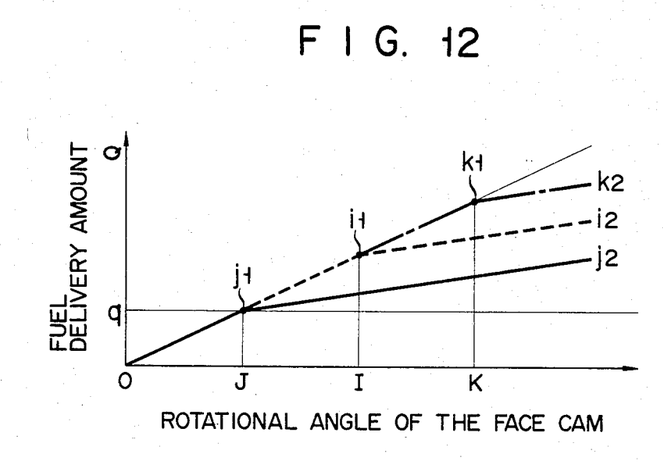
FIG. 12 shows fuel delivery amount characteristic curves obtained with use of the controller of FIG. 11.
Figure 13:
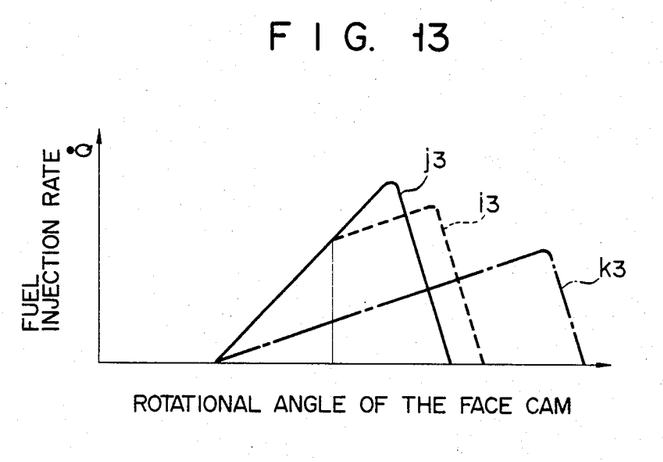
FIG. 13 shows fuel injection rate characteristic curves obtained with use of the controller of FIG. 11.

FIGS. 11 to 13 show the fourth embodiment of the invention. Referring now to FIG. 11, there is shown a controller 30 according to the fourth embodiment. The controller 30 is provided with a pressure control valve 80 which is adapte to open/close the throttle control hole 70 continually opening into the fluid chamber 48. The pressure control valve 80 is housed in a valve chamber 81 defined in the body 67, and is urged in the direction to close the throttle control hole 70 by a spring 82. Therefore, if the fuel pressure inside the fluid chamber 48 exceeds a predetermined level, the throttle control hole 70 is opened by the pressure control valve 80, when the fuel in the fluid chamber 48 is allowed to run into the fuel passage 55 through the throttle control hole 70.

The right end portion of the spring 82 urging the pressure control valve 80 is seated against a control screw 83. As shown in FIG. 11, the control screw 83 is fitted in a tapped hole 84 formed in the body 67. The right end portion of the control screw 83 extends into a gear chamber 85 in the body 67, and a parallel pair of flattened portions are formed on the outer peripheral surface of the right end portion of the control screw 83. A gear 87 is mounted on the flattened portions 86 of the control screw 83. The gear 87 is in mesh with a rack gear 88 which is slidably set in the body 67. Therefore, the control screw 83 can be axially moved with the aid of the gear 87 by sliding the rack gear 88 in the direction at right angles to the drawing plane of FIG. 11. Thus, the set load of the spring 82, that is, the value opening pressure of the pressure control valve 80 can be varied. The gear chamber 85 is closed in a liquid-tight manner by a cap screw 89 screwed in the body 67 and an O-ring 90.

The operation of the controller 30 of the fourth embodiment will now be described. In the initial stage of the pressurizing process, the pressure of the fuel in the pumping chamber 12 pressurized by the plunger 5 is low, so that the force to urge the intermediate piston 39 to the right is small. At this point of time, therefore, the fuel pressure inside the fluid chamber 48 is also low, so that the throttle control hole 70 is closed by the pressure control valve 80. Accordingly, the intermediate piston 39 hardly moves to the right. However, when the pressurizing process furhter advances to raise the fuel pressure inside the fluid chamber 48 up to the value opening pressure of the pressure control valve 80, the throttle control hole 70 is opened by the pressure control valve 80. As a result, the fuel in the fluid chamber 48 is allowed to run into the fuel passage 55 through the throttle control hole 70, so that the intermediate piston 39 is moved to the right by the pressure from the fuel in the pumping chamber 12. Therefore, in the controller 30 of the fourth embodiment, unlike the controllers of the foregoing embodiments, the rate of fuel delivered to the injection nozzle is reduced at the start of the rightward movement of the intermediate piston 39, that is, at the point of time when the throttle control hole 70 is opened. In this case, the fuel delivery amount characteristic is indicated by, for example, a line O-i1-i2 in FIG. 12. The fuel injection rate characteristic for the case is represented by a curve i3 in FIG. 13.

Since the opening time for the throttle control hole 70 can be advanced by lowering the vaiue opening pressure of the pressure control valve 80, the fuel delivery amount characteristic and fuel injection rate characteristic for the case are as indicated by a line O-j1-j2 in FIG. 12 and a curve j3 in FIG. 13, respectively. On the other hand, the opening time for the throttle control hole 70 can be delayed by raising the value opening pressure of the pressure control valve 80, so that the fuel delivery amount characteristic and fuel injection rate characteristic for the case are as indicated by a line O-k1-k2 in FIG. 12 and a curve k3 in FIG. 13, respectively.

Thus, also in the controller of the fourth embodiment, the fuel injection rate characteristic and injection timing can be controlled by varying the value opening pressure of the pressure control valve 80 in accordance with the operating state of the engine.

What is claimed:

1. A fuel injection device for injecting fuel into a combustion chamber of an internal combustion engine, comprising:

a pump housing;

a pump cylinder portion provided in said pump housing;

a pump plunger fitted in said pump cylinder portion in such a manner as to slide in its axial direction, said pump plunger defining a fuel pumping chamber for receiving the fuel in said pump cylinder portion;

fuel delivery means for reciprocating said pump plunger in said pump cylinder portion, thereby delivering the fuel in the fuel pumping chamber to the combustion chamber; and a controller for controlling a fuel delivery rate from the fuel pumping chamber to the combustion chamber, the fuel delivery rate indicating the amount of fuel delivered from the fuel pumping chamber per stroke travel-unit of said pump plunger, said controller including, a body having therein a controller cylinder portion which is provided coaxially with said pump plunger, piston means having a piston fitted in the controller cylinder portion of the body in a liquid-tight manner so as to be slidable in the axial direction of said pump plunger, one end of the piston extending into the fuel pumping chamber and engaging the distal end of said pump plunger so that the piston is moved together with said pump plunger in the same moving direction thereof when said pump plunger is moved in such a first direction as to increase the volume of the fuel pumping chamber, and that the piston receives the pressure of the fuel in the fuel pumping chamber to axially move independently of said pump plunger when said pump plunger is moved in such a second direction as to decrease the volume of the fuel pumping chamber, and control means for controlling the movement of the piston in such a manner that, when said plunger is moved in the second direction, the piston is prevented from being moved in the second direction or the moving speed of the piston is decreased, the movement of the piston being controlled in accordance with the operating condition of the engine.

2. A device according to claim 11, wherein said control means includes a fluid chamber which is defined by the other end of the piston fitted in the controller cylinder portion and into which fluid is introduced, and an escape passage formed in the body and opening into the fluid chamber; the piston includes an intermediate piston portion and a control piston portion, the one end of the intermediate piston portion engaging the distal end of the pump plunger, the control piston portion being normally in contact with the other end the intermediate piston portion at its one end, rotatable on the axis thereof, and the other end face the control piston portion serving to pressurize the fluid in the fluid chamber; that end face of the control piston portion which faces the fluid chamber being formed as an oblique lead to open and close an opening of the escape passage opening into the fluid chamber; and which further comprises rotating means for rotating the control piston portion.

3. A device according to claim 2, wherein the rotating means includes a control gear provided on the control piston to rotate together therewith and a driving gear provided on the output shaft of a step motor and in mesh with the control gear, the step motor being controlled in rotation in accordance with the operating state of the engine.

4. A device according to claim 2, wherein the escape passage serves also as a passage for introducing the fluid into the fluid chamber.

5. A device according to claim 4, wherein the fluid introduced into the fluid chamber is fuel.

6. A device according to claim 1, wherein said control means includes a fluid chamber which is defined by the other end of the piston fitted in the control cylinder portion and into which fluid is introduced, and an escape passage formed in the body and opening into the fluid chamber at a position such that the escape passage is never closed by the piston without regard to the position of the piston, the escape passage being provided with a throttle portion for reducing the cross-sectional area of the escape passage, and the fluid is introduced into the fluid chamber through a fluid feed passage formed in the body and opening into the fluid chamber, the fluid feed passage being provided with a check valve.

7. A device according to claim 1, wherein said control means includes a fluid chamber which is defined by the other end of the piston fitted in the control cylinder portion and into which fluid is introduced, and an escape passage formed in the body and opening into the fluid chamber; the piston includes an intermediate piston portion and a control piston portion, the one end of the intermediate piston portion engaging the distal end of the pump plunger, the control piston portion being rotatable on the axis thereof and serving to pressurize the fluid in the fluid chamber, the intermediate piston portion and the control piston portion defining an intermediate chamber therebetween, the intermediate chamber communicating with a feed hole formed in the body and opening thereinto so that the fluid can be introduced into the intermediate chamber through the feed hole, the opening of the feed hole in the intermediate chamber being adapted to be opened and closed by the intermediate piston portion, and the diameter of one end face of said control piston portion facing the intermediate chamber being smaller than that of the other end face facing the fluid chamber, the other end face serving as an oblique lead to open and close the opening of the escape passage opening into the fluid chamber, and which further comprises rotating means for rotating the control piston portion.

8. A device according to claim 7, wherein said rotating means includes a rod formed coaxially and integrally with said control piston portion and a step motor for controlling the rotation of the rod in accordance with the operating state of the engine.

9. A device according to claim 1, wherein said control means includes a fluid chamber which is defined by the other end of the piston fitted in the controller cylinder portion and into which fluid is introduced, and an escape passage formed in the body and opening into the fluid chamber, the escape passage being provided with a valve urged by a spring in the direction to close the escape passage against the pressure of the fluid in the fluid chamber, and which further comprises adjusting means for adjusting the urging force of the spring.

10. A device according to claim 9, wherein the adjusting means includes a control screw abutting against that end portion of the spring on the opposite side to the valve and axially movable in the body, a gear provided on that end portion of the control screw on the opposite side to the spring, and a rack gear in mesh with the gear to control the rotation thereof in accordance with the operating state of the engine.

* * * * *